Jan. 25, 1944.   W. G. GRIMES   2,340,052
ELECTRIC MOTOR BRAKE
Filed May 18, 1942   2 Sheets-Sheet 1
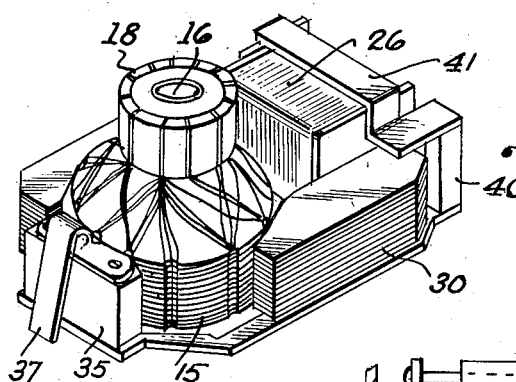
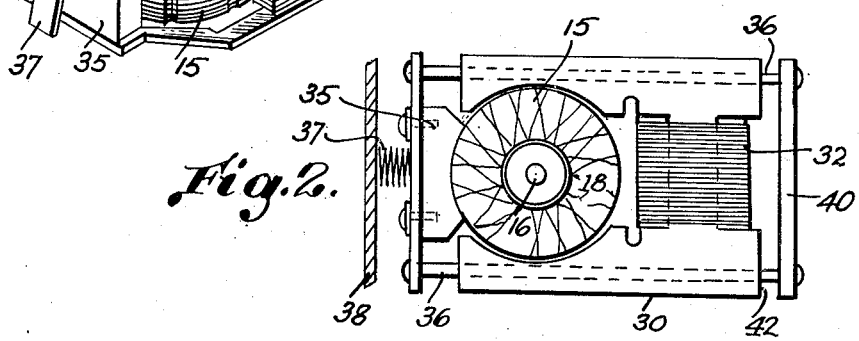
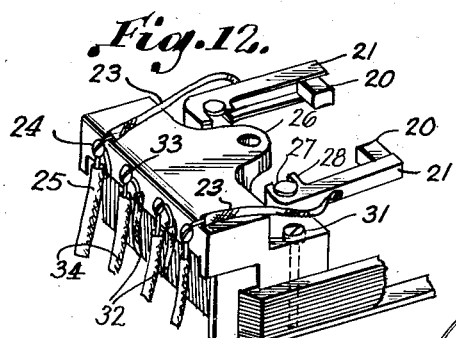
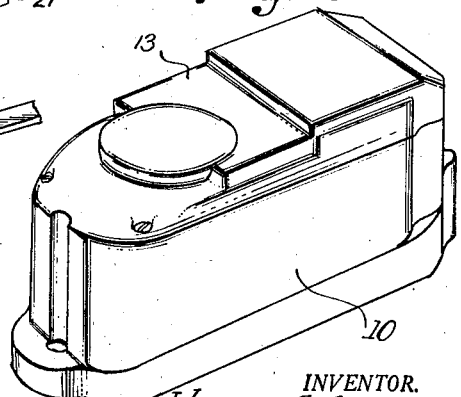
INVENTOR.
WARREN G GRIMES.
BY Miller & Miller
ATTORNEYS.

Jan. 25, 1944.  W. G. GRIMES  2,340,052
ELECTRIC MOTOR BRAKE
Filed May 18, 1942  2 Sheets-Sheet 2
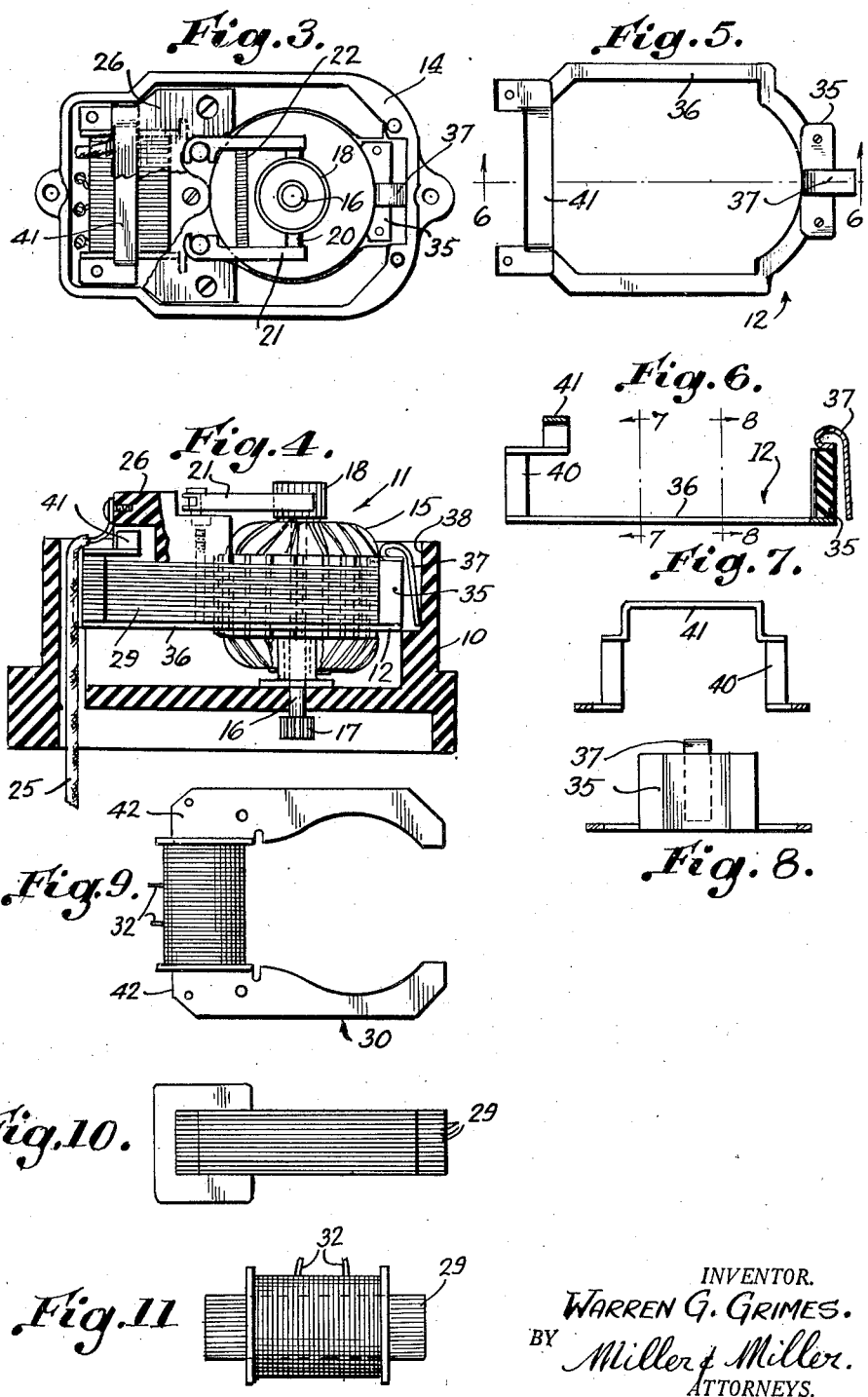
INVENTOR.
WARREN G. GRIMES.
BY Miller & Miller.
ATTORNEYS.

Patented Jan. 25, 1944

2,340,052

UNITED STATES PATENT OFFICE 2,340,052

ELECTRIC MOTOR BRAKE

Warren G. Grimes, Urbana, Ohio

Application May 18, 1942, Serial No. 443,477

4 Claims. (Cl. 188—171)

This invention relates to an electric motor brake and has for an object to provide an electric motor brake of the type wherein the brake will operate instantly to stop the rotation of the motor when the current is interrupted.

A further object of this invention is to provide an electric motor brake wherein the motor is held against rotation at all times except when the current is passing through the motor to rotate the same.

A still further object of this invention is to provide an electric motor and brake wherein the field for the armature of the motor also serves to hold the brake from acting while the current is passing through the field and releases the brake for action when the current to the field is cut off in the process of cutting off the current which operates the motor.

A still further object of this invention is to provide a motor and brake wherein the brake is released by the interruption of the field current to instantly stop the motor, and wherein the current to the field releases the brake pressure against the motor. permitting the motor to operate as intended.

Still a further object of this invention is to provide a motor and brake wherein the brake operates to stop the motor simultaneously with the interruption of the current thereto, and wherein the brake is released from the motor simultaneously with the completion of the circuit to the motor and is intended generally for use in services wherever it is desired to control the operation of an electric motor and to stop or start it instantly as desired without any momentum causing the motor to overrun a particular desired stopping point.

A particular use of this motor is in connection with the landing lights for aeroplanes such as shown in applicant's prior Patents Nos. 2,124,346 and 2,244,535. It will be understood, however, that the motor and brake is not limited to this particular use alone, but may be used anywhere that its particular functions are desirable.

With the foregoing and other objects in view, as will hereinafter become apparent, this invention comprises the combinations, constructions and arrangements of parts hereinafter set forth, disclosed, claimed and illustrated in the accompanying drawings.

In the drawings:

Figure 1 is a perspective view of a part of the motor and brake showing the armature and the field together with the brake with the housing omitted.

Fig. 2 is a schematic view of a modification disclosing the operation of the invention.

Fig. 3 is a top plan view showing the brake and field, together with the brushes and brush support partly broken away, assembled within the housing of the preferred form.

Fig. 4 is a sectional view, partly broken away through the housing, showing the motor in position.

Fig. 5 is a top plan view of the brake and brake frame.

Fig. 6 is a sectional view of the brake frame on line 6—6, Fig. 5.

Figs. 7 and 8 are sectional views of the brake frame on lines 7—7 and 8—8 of Fig. 6.

Figs. 9, 10 and 11 are top plan, side plan, and end plan views of the field.

Fig. 12 is a perspective view of the brushes and brush support in position on the field partly broken away, and Fig. 13 is a perspective view of the assembled motor and brake.

There is shown at 10 the housing in which the motor 11 and brake 12 are supported, a cap 13 being added to the top edge 14 of the housing 10 to completely seal and enclose the motor and brake therewithin. The motor 11 includes the armature 15, through which extends the shaft 16 having the power take-off gear 17 at one end thereof mounted externally of the housing 10, while the other end of the shaft 16 carries the commutator 18 for cooperation with the brushes 20, mounted at the ends of pivoted fingers 21 urged toward each other and hence toward the commutator by a connecting coil spring 22. The fingers 21 have leads 23 thereto leading to the connector screws 24 to which conductors 25 connect to a control switch, not shown.

The connecter screws 24 are supported in an insulator bracket 26 which bracket also supports flanged pivots 27 cooperating with bifurcated ends 28 of the brush fingers 21. This insulator bracket 26 is held in position on top of the motor field 30 by suitable stud bolts 31. The motor field 30 connects a plurality of soft iron plates 29 substantially horse-shoe shaped as shown, provided with the field coil 32 extending about its bight and having the ends of the coil 32 adapted to be connected to connector screws 33 on the insulator bracket 26 for connection by means of conduits 34 to the control switch and source of current, not shown.

The brake 12 for stopping the armature 15 from rotating consists of a rubber brake shoe 35 mounted on a non-magnetic frame 36 of aluminum or brass, provided with a yieldable spring 37 abutting against a recessed wall 38 in the housing 10 to urge and force the rubber brake shoe 35 into contact with the armature 15 and prevent its rotation. The brake frame 36 extends under the field plates 29 to the coil end thereof where it is provided with a pair of flux posts 40 made of soft iron and connected together by a soft iron flux bridge 41 which bridge 41 extends over the field coil 32, while the flux posts 40 are located just behind the coil ends of the arms of the field plates 29.

The above description equally applies to the modified form schematically shown in Fig. 2.

In operation the current to the field passes through the conductors 34 while the current to the brushes and the commutator pass through the conductors 25 by way of a suitable switch from a suitable source of supply. When the switch is so operated as to cause the motor to operate, the current passes about the field coil 32, creates a magnetic field in the field plates 29 within which the armature 15 rotates under the influence of the current coming from the brushes 20 to the commutator 18. The electro-magnetic force thus produced in the coil plates 29 provides a pull between the coil ends 42 and the flux posts 40 closing the gap therebetween and cause the flux posts 40 to stay in contact with the coil ends 42 of the field plates 29, thereby holding the brake frame 36 so as to press the brake shoe 35 away from the surface of the armature 15 compressing the leaf spring 37 against the recessed wall 38. So long as the current is being fed to the motor, this electro-magnetic force continues to exist and continues to hold the flux plates of the brake frame in contact with the coil ends 42 of the field plates 29, while the brake shoe 35 is held away from the armature. When the current is cut off, this electro-magnetic force ceases to exist because the coil 32 no longer has any current passing therethrough.

Accordingly, the flux posts 40 are released from being held by the field plates 29 and the spring 37 immediately shifts the brake shoe 35 together with the brake frame 36 to the position shown in Figs. 3 and 4, with the rubber brake shoe 35 in contact with the surface of the armature 15, thus serving to instantly stop the armature 15 from rotating simultaneously with the cutting off of the current thereto. When the motor is reactuated by again turning on the current, the current passing to the coil 32 immediately recreates the electro-magnetic pull on the flux posts 40, thus moving the brake shoe 35 away from contact with the armature 15, permitting it to rotate and to continue to rotate until the current is cut off, permitting the brake shoe 35 to again contact the surface of the armature 15.

It will thus be seen that as a result of this construction the armature can rotate freely while the current is on, and is stopped instantly when the current is cut off, without permitting any residual momentum to cause the motor to coast, thus providing practically a precision stoppage of the motor, a feature that is desirable in many types of operation.

While the device has been shown and the structure described in detail, it is obvious that this invention is not to be considered limited to the exact form disclosed and that changes may be made therein within the scope of what is claimed without departing from the spirit of the invention.

Having thus set forth and disclosed the nature of this invention, what is claimed is:

1. The combination with an electric motor having a horseshoe shaped field core, said field core including a pair of extending arms, a bight connecting one end of each of said extending arms, the other ends of said arms being unconnected, a field coil about said field core bight, and a motor armature rotatable between said extending arms when a magnetic flux is created therein by an electric current passing through said field coil and through said motor armature, the bight ends providing flux poles; of a motor armature brake comprising a braking element located between the unconnected ends of said extending field core arms, yieldable means normally urging said braking element into frictional contact with said motor armature, a horseshoe shaped non-magnetic frame on the bight of which said braking element is fixedly mounted, the arms of said non-magnetic frame extending along the arms of the field core to slightly beyond the bight flux poles, and means, mounted on the ends of said non-magnetic frame arms, actuatable by magnetic flux through the flux poles only when electric current is passing through the field coil to pull the flux actuatable means thereto and thus move said non-magnetic frame to move said braking element against its yieldable means and out of frictional contact with the motor armature, said yieldable means moving said braking element into braking contact against said motor armature when the electric current is stopped.

2. A device as set forth in claim 1 wherein said flux actuatable means comprises a pair of upstanding soft iron posts.

3. A device as set forth in claim 1 wherein said flux actuatable means comprises a pair of upstanding soft iron posts and a soft iron flux bridge connecting said posts over the field coil.

4. A device as set forth in claim 1 wherein said braking element comprises a rubber brake shoe having a braking surface corresponding in shape to the surface of the motor armature.

WARREN G. GRIMES.